United States Patent
Uchino

(10) Patent No.: US 9,568,224 B2
(45) Date of Patent: Feb. 14, 2017

(54) HEAT PUMP WATER HEATER APPARATUS AND HEATING AND DEFROST OPERATION, THEREOF

(71) Applicant: Mitsubishi Electric Corporation, Tokyo (JP)

(72) Inventor: Shinichi Uchino, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 110 days.

(21) Appl. No.: 14/023,519

(22) Filed: Sep. 11, 2013

(65) Prior Publication Data

US 2014/0109611 A1 Apr. 24, 2014

(30) Foreign Application Priority Data

Oct. 18, 2012 (JP) ................... 2012-230876

(51) Int. Cl.
  F25B 5/04 (2006.01)
  F25B 30/02 (2006.01)
  (Continued)

(52) U.S. Cl.
  CPC ........... *F25B 30/02* (2013.01); *F25B 5/04* (2013.01); *F25B 13/00* (2013.01); *F25B 49/005* (2013.01);
  (Continued)

(58) Field of Classification Search
  CPC .......... F25B 13/00; F25B 5/04; F24D 17/02; F24D 3/12; F24D 3/18
  See application file for complete search history.

(56) References Cited

U.S. PATENT DOCUMENTS

2004/0134225 A1 7/2004 Sakamoto et al.
2009/0113911 A1 5/2009 Nakayama
(Continued)

FOREIGN PATENT DOCUMENTS

CN 101208564 A 6/2008
EP 1 396 689 A1 3/2004
(Continued)

OTHER PUBLICATIONS

Machine Translation for JP 2012-007800.*
(Continued)

*Primary Examiner* — Ryan J Walters
*Assistant Examiner* — Antonio R Febles
(74) *Attorney, Agent, or Firm* — Posz Law Group, PLC

(57) ABSTRACT

It is an object to prevent a liquid refrigerant from being drawn into a compressor. A heat pump apparatus includes a refrigerant circuit in which a refrigerant circulates, and which is configured by sequentially connecting a compressor, a first heat exchanger, an expansion valve, a second heat exchanger, and a third heat exchanger, and connecting a bypass flow path bypassing the third heat exchanger between the second heat exchanger and the compressor. The heat pump apparatus also includes a water circuit in which water circulates, and which is configured by sequentially connecting the third heat exchanger, the first heat exchanger, and a tank. In the heat pump apparatus, if there is a risk of the liquid refrigerant being drawn into the compressor, a three-way valve is controlled such that the refrigerant flows through the third heat exchanger to be heated by water and evaporated.

13 Claims, 13 Drawing Sheets

(51) Int. Cl.
  *F25B 13/00* (2006.01)
  *F25B 49/00* (2006.01)
  *F24D 3/18* (2006.01)
(52) U.S. Cl.
  CPC ............ *F24D 3/18* (2013.01); *F25B 2339/047* (2013.01); *F25B 2400/0409* (2013.01); *F25B 2500/28* (2013.01)

(56) References Cited

U.S. PATENT DOCUMENTS

| | | | |
|---|---|---|---|
| 2009/0165481 A1* | 7/2009 | Ko et al. | 62/195 |
| 2010/0287964 A1 | 11/2010 | Okamoto | |
| 2012/0186284 A1 | 7/2012 | Choi et al. | |

FOREIGN PATENT DOCUMENTS

| | | |
|---|---|---|
| EP | 1 914 485 A1 | 4/2008 |
| EP | 2 244 038 A1 | 10/2010 |
| EP | 2 420 767 A2 | 2/2012 |
| EP | 2 479 519 A2 | 7/2012 |
| FR | 2 937 410 A1 | 4/2010 |
| JP | 10-009683 A | 1/1998 |
| JP | 2002-098429 A | 4/2002 |
| JP | 2007-139415 A | 6/2007 |
| JP | 2010-181088 A | 8/2010 |
| JP | 2011-169558 A | 9/2011 |
| JP | 2012-007800 A | 1/2012 |

OTHER PUBLICATIONS

Extended Search Report dated Nov. 7, 2013 in the corresponding EP application No. 13183175.2-1602.
Office Action dated Nov. 11, 2014 issued in corresponding JP patent application No. 2012-230876 (and English translation).
Extended Search Report dated Nov. 11, 2013 in the corresponding EP application No. 13183175.2-1602.
Office Action mailed Aug. 3, 2015 in the corresponding CN application No. 201310489287.4 (with English translation).

* cited by examiner

HEAT PUMP WATER HEATER APPARATUS AND HEATING AND DEFROST OPERATION, THEREOF

CROSS-REFERENCE TO RELATED APPLICATIONS

This application is based on and claims the benefit of priority from Japanese Patent Application No. 2012-230876, filed in Japan on Oct. 18, 2012, the content of which is incorporated herein by reference in its entirety.

TECHNICAL FIELD

This invention relates to a technique of preventing a liquid refrigerant from being drawn into a compressor in a heat pump apparatus.

BACKGROUND ART

There is a heat pump apparatus that heats water using heat absorbed from ambient air. There is a heat pump water heater that heats water in a tank using the water heated by the heat pump apparatus, and there is a heat pump heating apparatus that performs a heating operation using the water heated by the heat pump apparatus.

In the heat pump water heater, when the temperature of the water in the tank reaches the target temperature, the operating frequency of a compressor included in the heat pump apparatus is lowered to reduce power consumption. Likewise, in the heat pump heating apparatus, when the temperature of a room to be heated reaches the target temperature, the operating frequency of the compressor included in the heat pump apparatus is lowered to reduce power consumption.

When the operating frequency of the compressor is lowered, this reduces the flow volume of a refrigerant circulating in a refrigerant circuit included in the heat pump apparatus. With the reduced flow volume of the refrigerant, the pressure of the refrigerant cannot be lowered much even if the opening degree of an expansion valve included in the heat pump apparatus is set to a minimum degree. When the pressure of the refrigerant cannot be lowered, this means that the evaporation temperature of the refrigerant cannot be lowered. Therefore, when the ambient air temperature is low, the evaporation temperature of the refrigerant may not be able to be lowered sufficiently compared to the ambient air temperature.

When the evaporation temperature of the refrigerant cannot be lowered sufficiently compared to the ambient air temperature, the refrigerant cannot sufficiently absorb heat from the ambient air. As a result, the refrigerant cannot be completely evaporated, and the liquid refrigerant is drawn into the compressor. When the liquid refrigerant is drawn into the compressor, a lubricating oil present in the compressor is brought out of the compressor, so that lubricity is reduced and the compressor fails to operate properly.

Conventionally, when the evaporation temperature of the refrigerant cannot be lowered sufficiently compared to the ambient air temperature, the operating frequency of the compressor is increased, thereby increasing the flow volume of the refrigerant circulating in the refrigerant circuit, so as to prevent the liquid refrigerant from being drawn into the compressor (see Patent Literature 1).

CITATION LIST

Patent Literature

[Patent Literature 1] JP 10-009683 A

DISCLOSURE OF INVENTION

Technical Problem

Increasing the operating frequency of a compressor causes an increase in power consumption.

It is an object of the present invention to prevent a liquid refrigerant from being drawn into the compressor without increasing the operating frequency of the compressor.

Solution to Problem

A heat pump apparatus according to the present invention includes
a refrigerant circuit in which a refrigerant circulates, and which is configured by sequentially connecting a compressor, a first heat exchanger, an expansion valve, a second heat exchanger, and a third heat exchanger, and connecting a bypass flow path bypassing the third heat exchanger between the second heat exchanger and the compressor;
a fluid circuit in which a fluid circulates, and which is configured by sequentially connecting the third heat exchanger, the first heat exchanger, and a radiator; and
a flow path switching device that switches between making the refrigerant flow through the third heat exchanger and making the refrigerant flow through the bypass flow path without flowing through the third heat exchanger.

Advantageous Effects of Invention

A heat pump apparatus according to the present invention includes a third heat exchanger that makes a refrigerant that is to be drawn into a compressor heat-exchanged with a fluid circulating in a fluid circuit. Thus, when the evaporation temperature of the refrigerant cannot be lowered sufficiently compared to the ambient air temperature, the refrigerant is made to flow through the third heat exchanger so that the refrigerant is heated by the fluid and can be turned into the gas refrigerant. As a result, the liquid refrigerant can be prevented from being drawn into the compressor.

BRIEF DESCRIPTION OF DRAWINGS

The present invention will become fully understood from the detailed description given hereinafter in conjunction with the accompanying drawings, in which.

DESCRIPTION OF PREFERRED EMBODIMENTS

Figure 1:
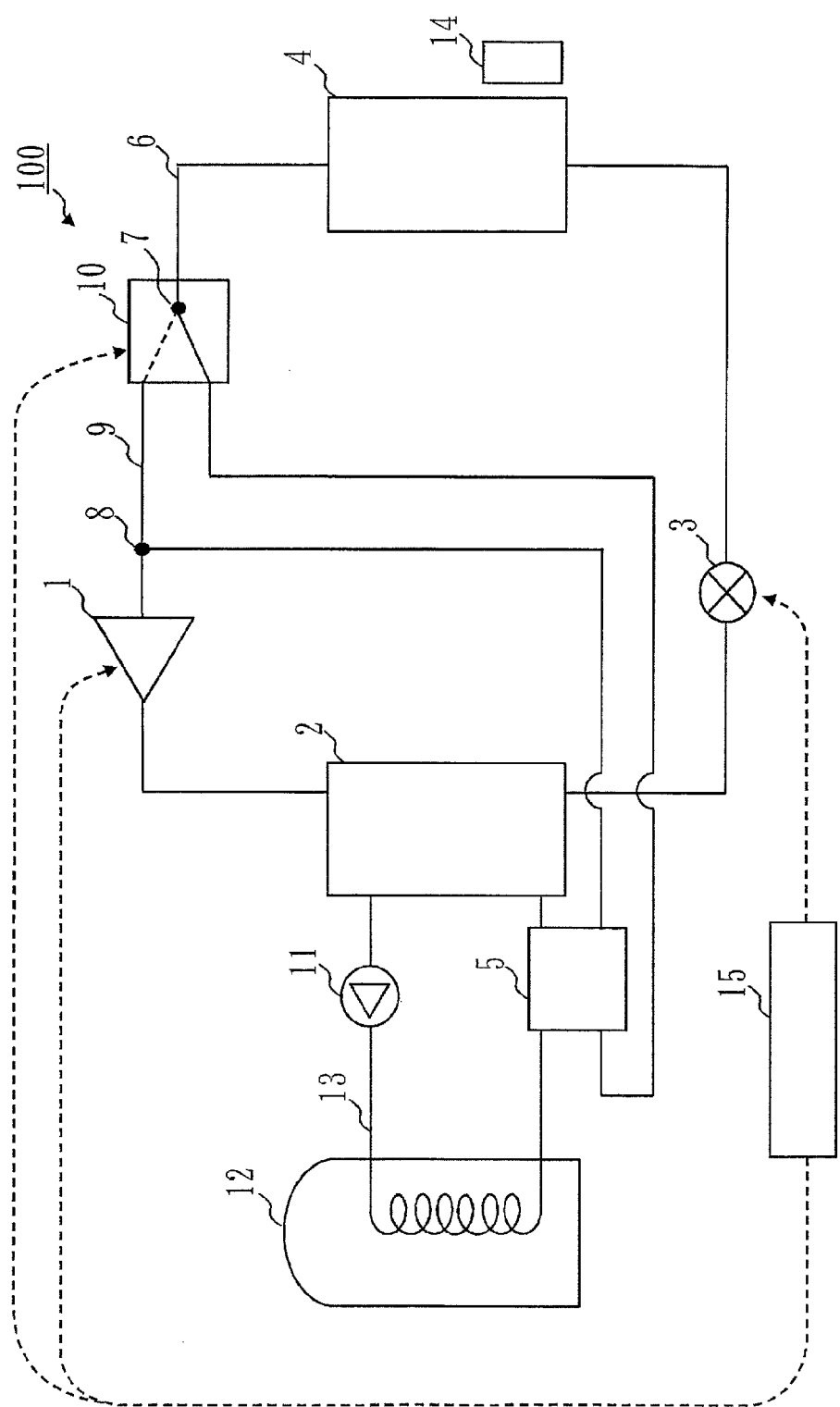
FIG. 1 is a configuration diagram of a heat pump apparatus 100 according to a first embodiment.

In describing preferred embodiments illustrated in the drawings, specific terminology is employed for the sake of clarity. However, the disclosure of the present invention is not intended to be limited to the specific terminology so selected, and it is to be understood that each specific element includes all technical equivalents that operate in a similar manner and achieve a similar result.

First Embodiment

FIG. 1 is a configuration diagram of a heat pump apparatus 100 according to a first embodiment.

The heat pump apparatus 100 includes a refrigerant circuit 6 configured circularly by sequentially connecting with pipes a compressor 1, a first heat exchanger 2, an expansion valve 3, a second heat exchanger 4, and a third heat exchanger 5. The refrigerant circuit 6 is provided with a bypass flow path 9 bypassing the third heat exchanger 5. The bypass flow path 9 is configured by connecting with pipes a first connection point 7 between the second heat exchanger 4 and the third heat exchanger 5 with a second connection point 8 between the third heat exchanger 5 and the compressor 1.

At the first connection point 7, a three-way valve 10 (an example of a flow path switching device) is provided to switch between making a refrigerant flow through the third heat exchanger 5 and making the refrigerant flow through the bypass flow path 9 without flowing through the third heat exchanger 5.

The refrigerant such as R410A circulates in the refrigerant circuit 6.

The heat pump apparatus 100 also includes a water circuit 13 (an example of a fluid circuit) configured circularly by sequentially connecting with pipes the third heat exchanger 5, the first heat exchanger 2, a pump 11, and a tank 12 (an example of a radiator).

Water (an example of a fluid) circulates in the water circuit 13.

The heat pump apparatus 100 also includes a temperature sensor 14 that detects an ambient air temperature, that is, a temperature of air around the second heat exchanger 4, and a control device 15 that controls an operating frequency of the compressor 1, an opening degree of the expansion valve 3, opening and closing of the three-way valve 10, and so on. The control device 15 is configured with a microcomputer or the like, for example.

Figure 2:
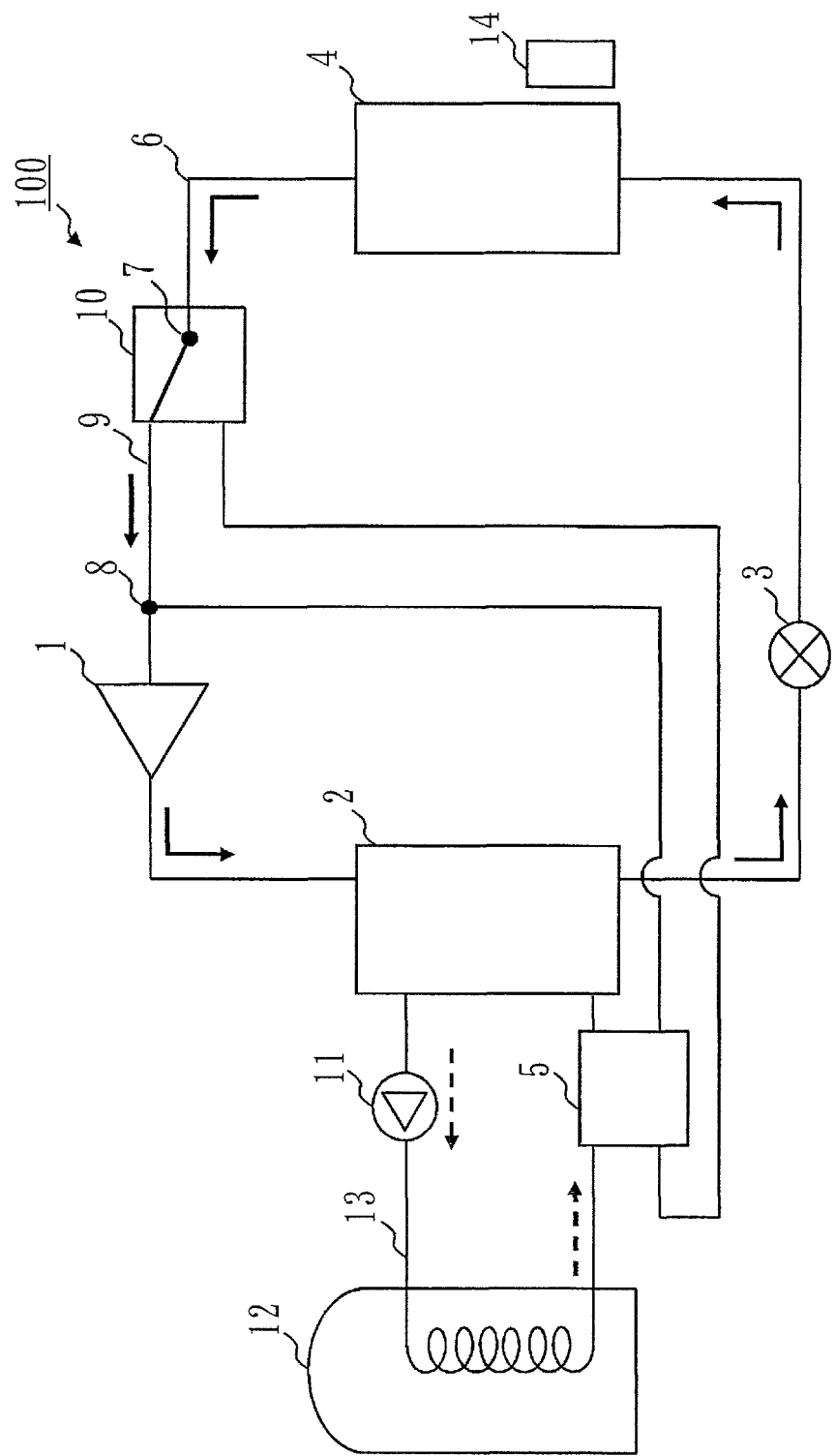
FIG. 2 is a diagram showing how a refrigerant and water flow in the heat pump apparatus 100 according to the first embodiment in a regular operation.

FIG. 2 is a diagram showing how the refrigerant and water flow in the heat pump apparatus 100 according to the first embodiment in a regular operation. In FIG. 2, solid arrows indicate a flow of the refrigerant, and dashed arrows indicate a flow of the water.

In the regular operation, the three-way valve 10 is set by the control device 15 to open the dashed-line side shown in FIG. 1.

In the refrigerant circuit 6, the gas refrigerant being made high-temperature and high-pressure by the compressor 1 flows into the first heat exchanger 2. The gas refrigerant that has flowed into the first heat exchanger 2 is heat-exchanged with the water circulating in the water circuit 13, and condenses and turns into the liquid refrigerant. At this time, the water circulating in the water circuit 13 is heated. The liquid refrigerant passes through the expansion valve 3 where it expands, and turns into the gas-liquid two-phase refrigerant which is low-temperature and low-pressure. The gas-liquid two-phase refrigerant flows into the second heat exchanger 4 to be heat-exchanged with ambient air (an example of a heat exchange agent), and evaporates and turns into the gas refrigerant. The gas refrigerant passes through the bypass flow path 9 without passing through the third heat exchanger 5, and is drawn into the compressor 1 again to become high-temperature and high-pressure.

In the water circuit 13, the water heated in the first heat exchanger 2 passed through the pump 11, and flows into the tank 12. The water that has flowed into the tank 12 is heat-exchanged with water stored in the tank 12, thereby being cooled. At this time, the water stored in the tank 12 is heated. The cooled water passes through the third heat exchanger 5, and flows into the first heat exchanger 2 again. Since the refrigerant is not flowing through the third heat exchanger 5, the water is not heat-exchanged in the third heat exchanger 5.

When the heat pump apparatus 100 continues to operate for a while, the temperature of the water stored in the tank 12 rises to reach the target temperature. Upon detecting by a temperature sensor or the like (not illustrated) that the temperature of the water stored in the tank 12 has reached the target temperature, the control device 15 lowers the setting of the operating frequency of the compressor 1. In this way, the temperature of the water stored in the tank 12 is maintained sufficiently high while power consumption is reduced.

When the operating frequency of the compressor 1 is lowered, the flow volume of the refrigerant circulating in the refrigerant circuit 6 is reduced. The opening degree of the expansion valve 3 is controlled such that a degree of superheating of the refrigerant flowing out from the second heat exchanger 4 reaches a predetermined value. However, there is a limit to how small the opening degree of the expansion valve 3 can be made. If the flow volume of the refrigerant is low, the pressure of the refrigerant cannot be reduced much even if the opening degree of the expansion valve 3 is a minimum degree. When the pressure of the refrigerant cannot be lowered, this means that an evaporation temperature of the refrigerant cannot be lowered. Thus, when the ambient air temperature is low, it may not be possible to lower the evaporation temperature of the refrigerant sufficiently compared to the ambient air temperature.

When the evaporation temperature of the refrigerant cannot be lowered sufficiently compared to the ambient air temperature, the refrigerant cannot sufficiently absorb heat from the ambient air in the second heat exchanger 4. As a result, the refrigerant cannot be completely turned into the gas refrigerant, so that the liquid refrigerant is drawn into the compressor 1. When the liquid refrigerant is drawn into the compressor 1, a lubricating oil present in the compressor 1 is brought out of the compressor 1, so that lubricity is reduced and the compressor 1 fails to operate properly.

Accordingly, when the operating frequency of the compressor 1 is lower than a predetermined frequency, and the opening degree of the expansion valve 3 is the minimum degree, and the ambient air temperature detected by the temperature sensor 14 is lower than a predetermined first temperature (when the operating frequency is low and the ambient air temperature is low), the control device 15 switches the setting of the three-way valve 10 to open the solid-line side shown in FIG. 1.

The predetermined frequency and the first temperature vary depending on the type of the refrigerant to be used, the minimum opening degree of the expansion valve 3, and so on. Thus, for example, values obtained in advance through computation or simulation are stored in a memory or the like provided in the control device 15.

Figure 3:
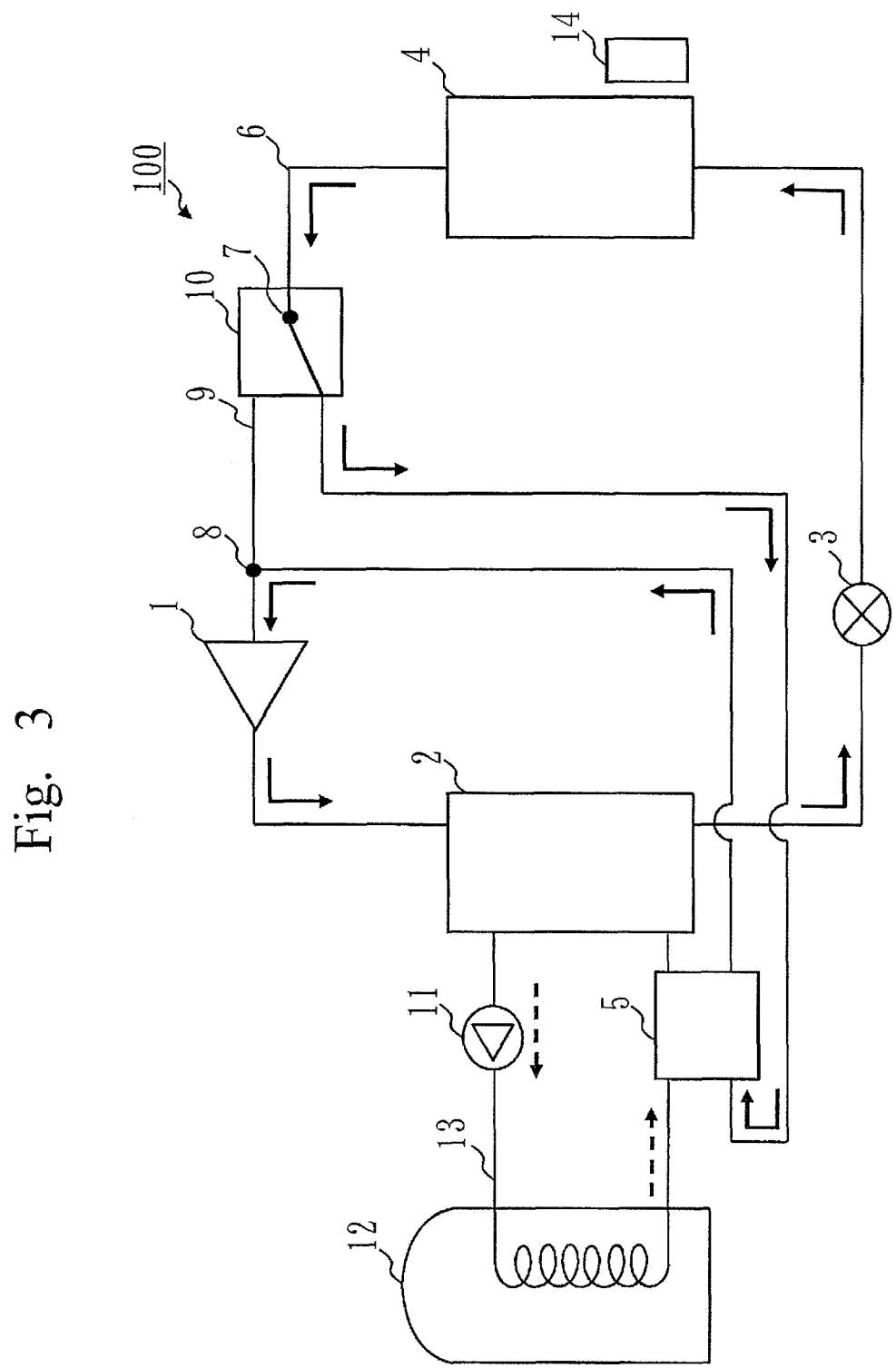
FIG. 3 is a diagram showing how the refrigerant and water flow in the heat pump apparatus 100 according to the first embodiment when the operating frequency is low and the ambient air temperature is low.

FIG. 3 is a diagram showing how the refrigerant and water flow in the heat pump apparatus 100 according to the first embodiment when the operating frequency is low and the ambient air temperature is low. In FIG. 3, solid arrows indicate a flow of the refrigerant, and dashed arrows indicate a flow of the water.

When the operating frequency is low and the ambient air temperature is low, the three-way valve 10 is set by the control device 15 to open the solid-line side shown in FIG. 1.

In the refrigerant circuit 6, the gas refrigerant being made high-temperature and high-pressure by the compressor 1 flows into the first heat exchanger 2. The gas refrigerant that has flowed into the first heat exchanger 2 is heat-exchanged with the water circulating in the water circuit 13, and condenses and turns into the liquid refrigerant. At this time, the water circulating in the water circuit 13 is heated. The liquid refrigerant passes through the expansion valve 3 where it expands, and flows into the second heat exchanger 4. In this case, the pressure of the refrigerant after passing through the expansion valve 3 is not sufficiently low, and the evaporation temperature of the refrigerant is not sufficiently low compared to the ambient air temperature. Thus, the refrigerant does not completely evaporate and turn into the gas refrigerant, and at least part of the refrigerant remains as the liquid refrigerant.

The refrigerant including the liquid refrigerant flows from the three-way valve 10 in a direction of the third heat exchanger 5, and flows into the third heat exchanger 5. The refrigerant that has flowed into the third heat exchanger 5 is heat-exchanged with the water circulating in the water circuit 13. At this time, the water circulating in the water circuit 13 is at a temperature at least higher than 0° C. On the other hand, although the pressure of the refrigerant cannot be sufficiently lowered, it is generally possible to lower the evaporation temperature of the refrigerant to a temperature lower than 0° C., so that the refrigerant is at lower than 0° C. Thus, in this case, the refrigerant absorbs heat from the water circulating in the water circuit 13, and the refrigerant evaporates and turns into the gas refrigerant. The gas refrigerant is drawn into the compressor 1 to become high-temperature and high-pressure.

In the water circuit 13, the water heated in the first heat exchanger 2 passes through the pump 11, and flows into the tank 12. The water that has flowed into the tank 12 is heat-exchanged with the water stored in the tank 12, thereby being cooled. At this time, the water stored in the tank 12 is heated. The cooled water is heat-exchanged with the refrigerant in the third heat exchanger 5, thereby being cooled further, and flows into the first heat exchanger 2 again.

That is, when the operating frequency is low and the ambient air temperature is low, the refrigerant is made to flow to the third heat exchanger 5 so that in the third heat exchanger 5 the refrigerant is heated by the water circulating in the water circuit 13. With this arrangement, the refrigerant is drawn into the compressor 1 as the gas refrigerant.

Figure 4:
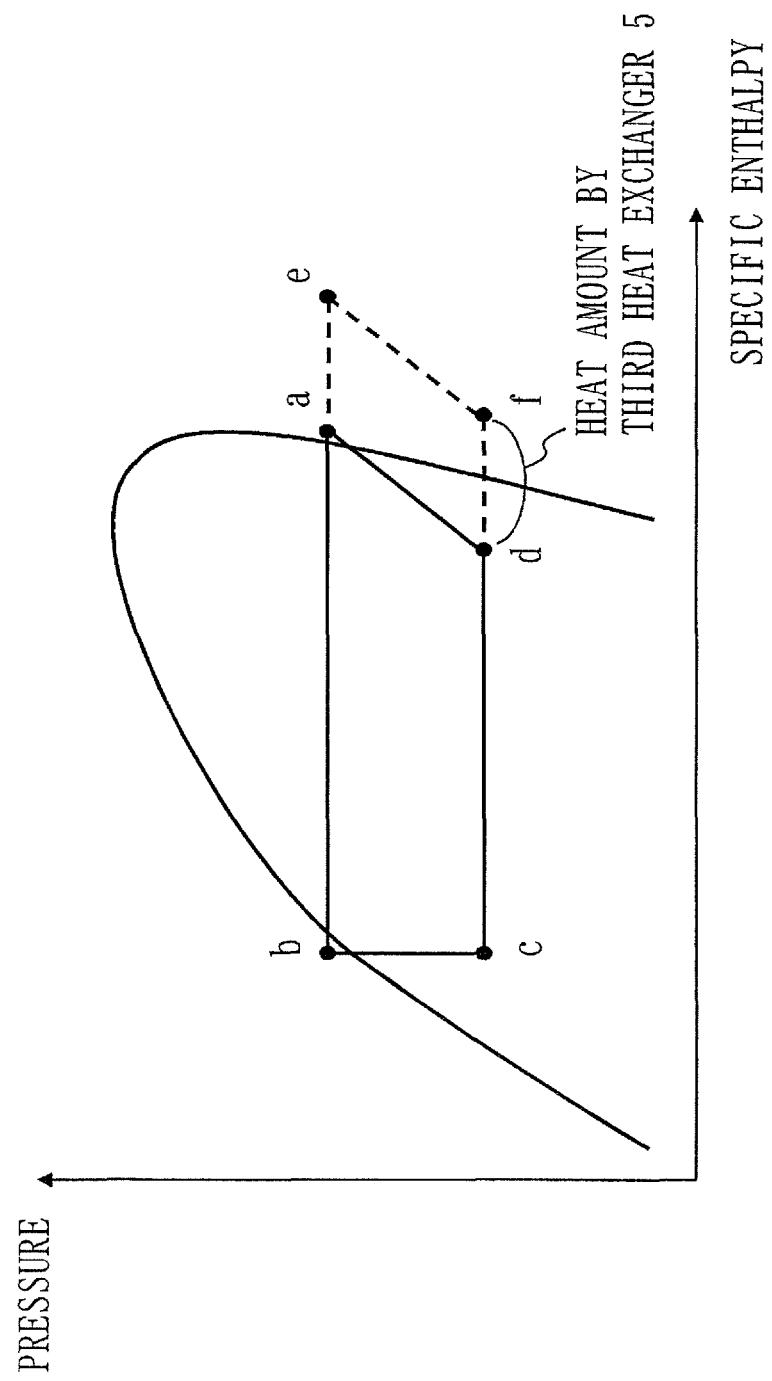
FIG. 4 is a P-h diagram of the heat pump apparatus 100 according to the first embodiment when the operating frequency is low and the ambient air temperature is low.

FIG. 4 is a P-h diagram of the heat pump apparatus 100 according to the first embodiment when the operating frequency is low and the ambient air temperature is low. In FIG. 4, solid lines correspond to a case where the refrigerant does not flow through the third heat exchanger 5, and dashed lines correspond to a case where the refrigerant flows through the third heat exchanger 5. Note that only a solid line is shown at a portion where a solid line and a dashed line overlap with each other.

When the refrigerant does not flow through the third heat exchanger 5, the gas refrigerant (point a) compressed by the compressor 1 passes through the first heat exchanger 2, and turns into the liquid refrigerant (point b). The liquid refrigerant (point b) passes through the expansion valve 3, and turns into the gas-liquid two-phase refrigerant (point c). The gas-liquid two-phase refrigerant (point c) passes through the second heat exchanger 4, and turns into the gas-liquid two-phase refrigerant (point d). Then, the gas-liquid two-phase refrigerant (point d) passes through the compressor 1, and turns into the gas refrigerant (point a). That is, the gas-liquid two-phase refrigerant (point d) is drawn into the compressor 1.

On the other hand, when the refrigerant flows through the third heat exchanger 5, the gas refrigerant (point e) compressed by the compressor 1 passes through the first heat exchanger 2, and turns into the liquid refrigerant (point b). The liquid refrigerant (point b) passes through the expansion valve 3, and turns into the gas-liquid two-phase refrigerant (point c). The gas-liquid two-phase refrigerant (point c) passes through the second heat exchanger 4, and turns into the gas-liquid two-phase refrigerant (point d). The gas-liquid two-phase refrigerant (point d) passes through the third heat exchanger 5, and turns into the gas refrigerant (point f). Then, the gas refrigerant (point f) passes through the compressor 1, and turns into the gas refrigerant (point e). That is, the gas refrigerant (point f) is drawn into the compressor 1.

Therefore, a difference between point d and point f is a heat amount by the third heat exchanger 5.

It is described herein that the liquid refrigerant (point b) passes through the expansion valve 3, and turns into the gas-liquid two-phase refrigerant (point c). There may be a situation where the liquid refrigerant (point b) remains as the liquid refrigerant even after passing through the expansion valve 3. Even in this case, the operation of the heat pump apparatus 100 is not affected, and the operation of the heat pump apparatus 100 remains the same.

Figure 5:
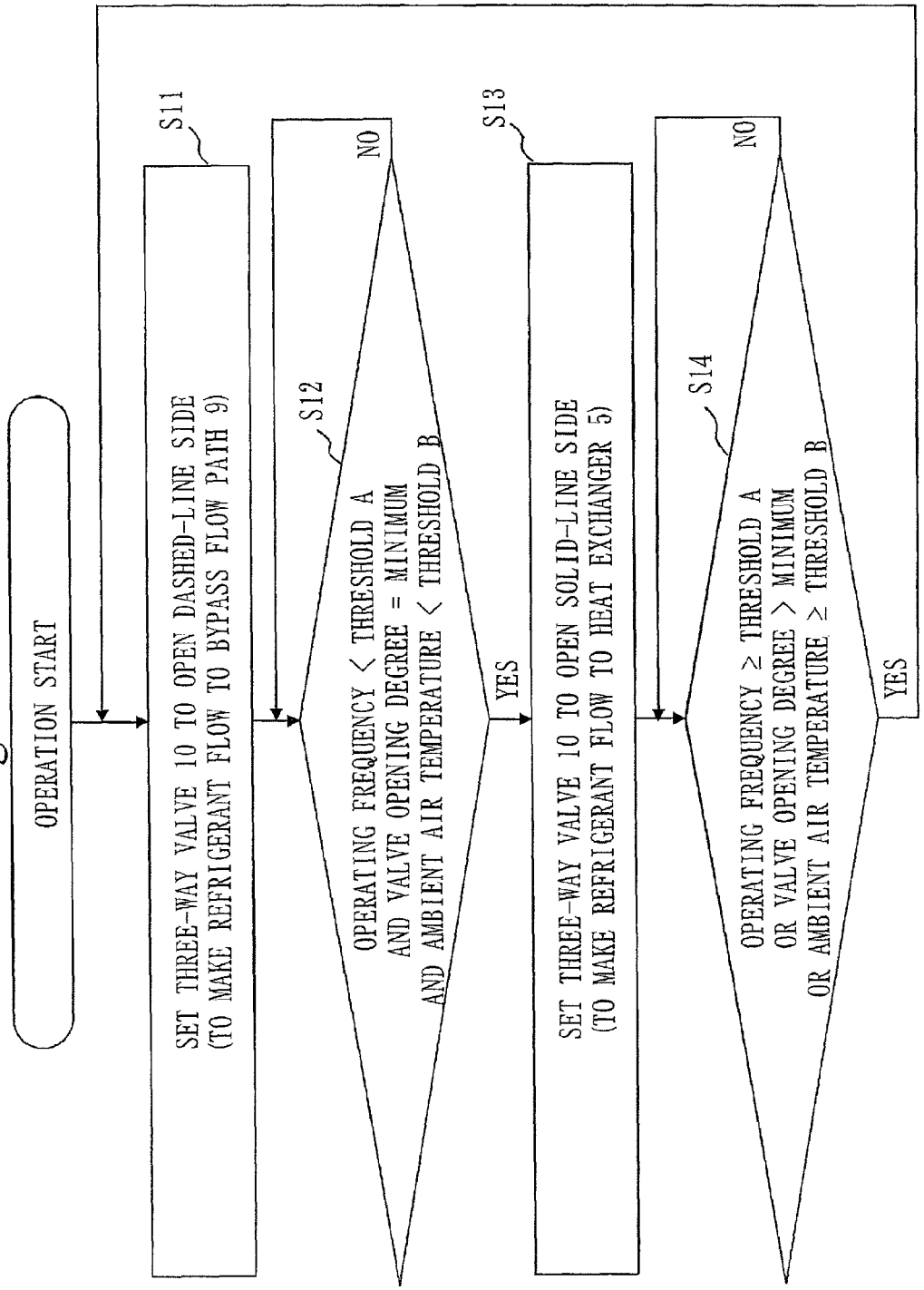
FIG. 5 is a flowchart showing an operation to control a three-way valve 10 by a control device 15 according to the first embodiment.

FIG. 5 is a flowchart showing an operation to control the three-way valve 10 by the control device 15 according to the first embodiment.

(S11)

The control device 15 sets the three-way valve 10 to open the dashed-line side shown in FIG. 1. With this setting, the refrigerant passes through the bypass flow path 9, and does not flow through the third heat exchanger 5.

(S12)

The control device 15 determines whether the operating frequency of the compressor 1 is lower than the predetermined frequency (threshold A), and the opening degree of the expansion valve 3 is the minimum degree, and the ambient air temperature detected by the temperature sensor 14 is lower the first temperature (threshold B).

If the operating frequency of the compressor 1 is lower than the predetermined frequency, and the opening degree of the expansion valve 3 is the minimum degree, and the ambient air temperature detected by the temperature sensor 14 is lower the first temperature (YES in S12), processing proceeds to S13. In other cases (NO in S12), determination in S12 is performed again after a predetermined period of time passes.

(S13)

The control device 15 sets the three-way valve 10 to open the solid-line side shown in FIG. 1. With this setting, the refrigerant flows through the third heat exchanger 5.

(S14)

The control device 15 determines whether the operating frequency of the compressor 1 is equal to or higher than the predetermined frequency (threshold A), or the opening degree of the expansion valve 3 is greater than the minimum degree, or the ambient air temperature detected by the temperature sensor 14 is equal to or higher than the first temperature (threshold B).

If the operating frequency of the compressor 1 is equal to or higher than the predetermined frequency, or the opening degree of the expansion valve 3 is greater than the minimum degree, or the ambient air temperature detected by the temperature sensor 14 is equal to or higher than the first temperature (YES in S14), processing returns to S11. In other cases (NO in S14), determination in S14 is performed again after a predetermined period of time passes.

As described above, in the heat pump apparatus 100 according to the first embodiment, if the operating frequency of the compressor 1 is lower than the predetermined frequency, and the opening degree of the expansion valve 3 is the minimum degree, and the ambient air temperature is lower than the first temperature, it is determined that the liquid refrigerant is drawn into the compressor 1. In this case, the refrigerant is made to flow through the third heat exchanger 5 before being drawn into the compressor 1.

With this arrangement, the refrigerant is heated in the third heat exchanger 5, and evaporates and turns into the gas refrigerant before being drawn into the compressor 1. Thus, the liquid refrigerant can be prevented from being drawn into the compressor 1.

Second Embodiment

The first embodiment has described the operation in a heating operation with which the water is heated and then the water stored in the tank 12 is heated. A second embodiment will describe the operation in a defrost operation with which frost attached to the second heat exchanger 4 is removed.

Figure 6:
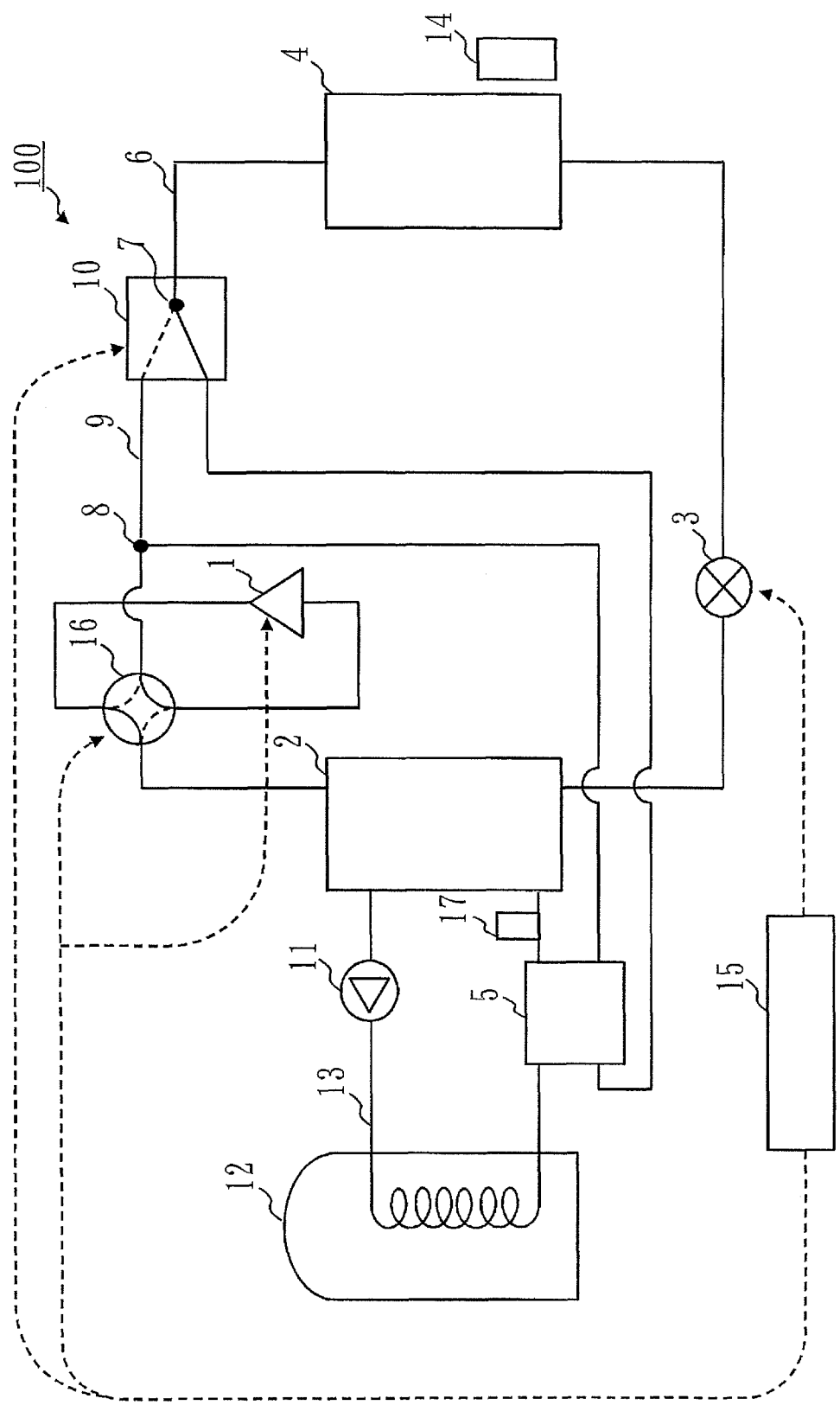
FIG. 6 is a configuration diagram of the heat pump apparatus 100 according to a second embodiment.

FIG. 6 is a configuration diagram of the heat pump apparatus 100 according to the second embodiment.

In addition to the configuration of the heat pump apparatus 100 according to the first embodiment, the heat pump apparatus 100 according to the second embodiment includes a four-way valve 16 (direction switching device) that switches the direction in which the refrigerant circulates, and a temperature sensor 17 that detects the temperature of the water flowing into the first heat exchanger 2.

Figure 7:
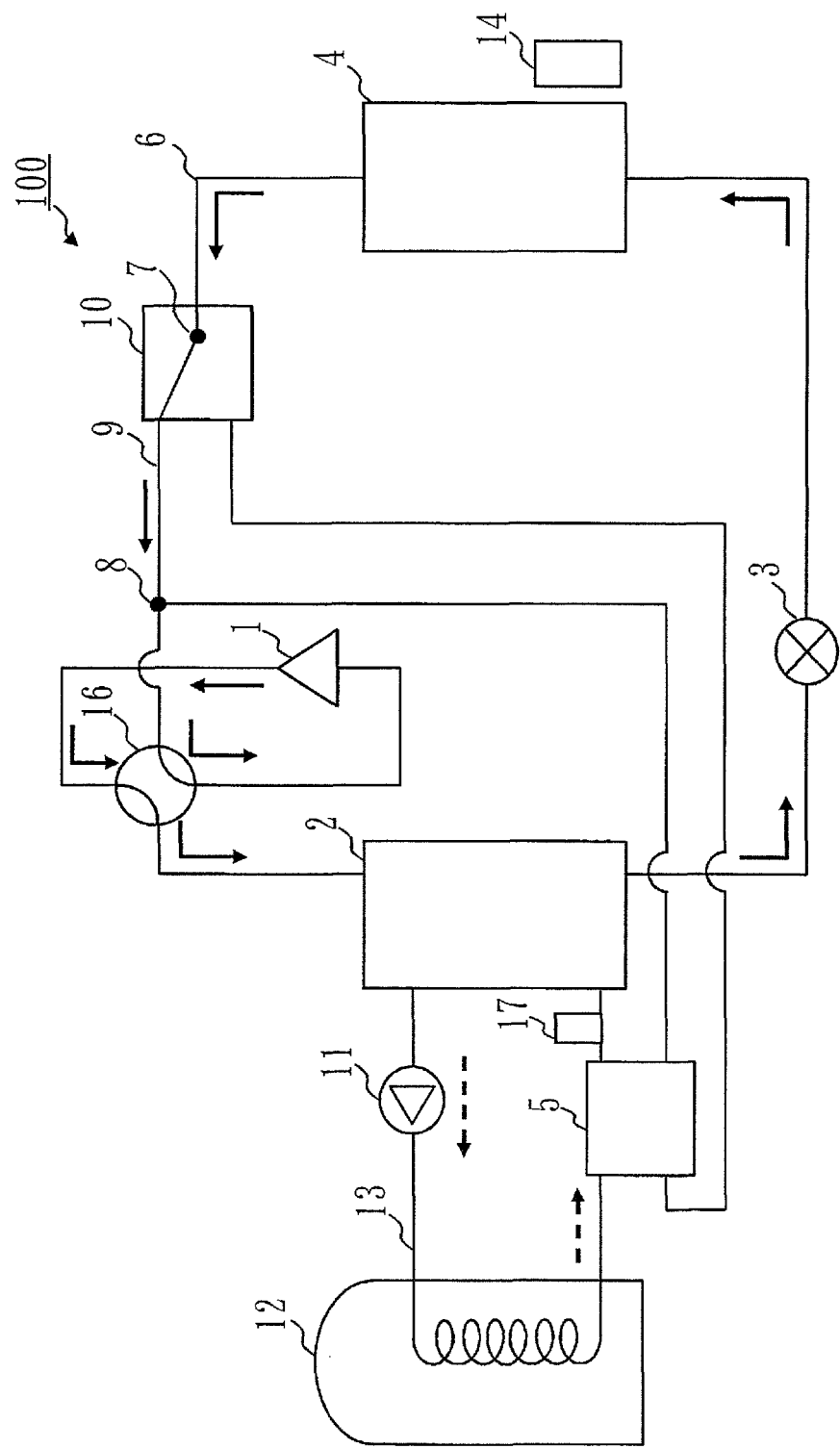
FIG. 7 is a diagram showing how the refrigerant and water flow in the heat pump apparatus 100 according to the second embodiment in a regular heating operation.

FIG. 7 is a diagram showing how the refrigerant and water flow in the heat pump apparatus 100 according to the second embodiment in a regular heating operation. In FIG. 7, solid arrows indicate a flow of the refrigerant, and dashed arrows indicate a flow of the water.

In the regular heating operation, the four-way valve 16 is set by the control device 15 to open the solid-line side shown in FIG. 6, and the three-way valve 10 is set by the control device 15 to open the dashed-line side shown in FIG. 6. With this arrangement, the heat pump apparatus 100 operates in the same manner as in the case of FIG. 2.

Figure 8:
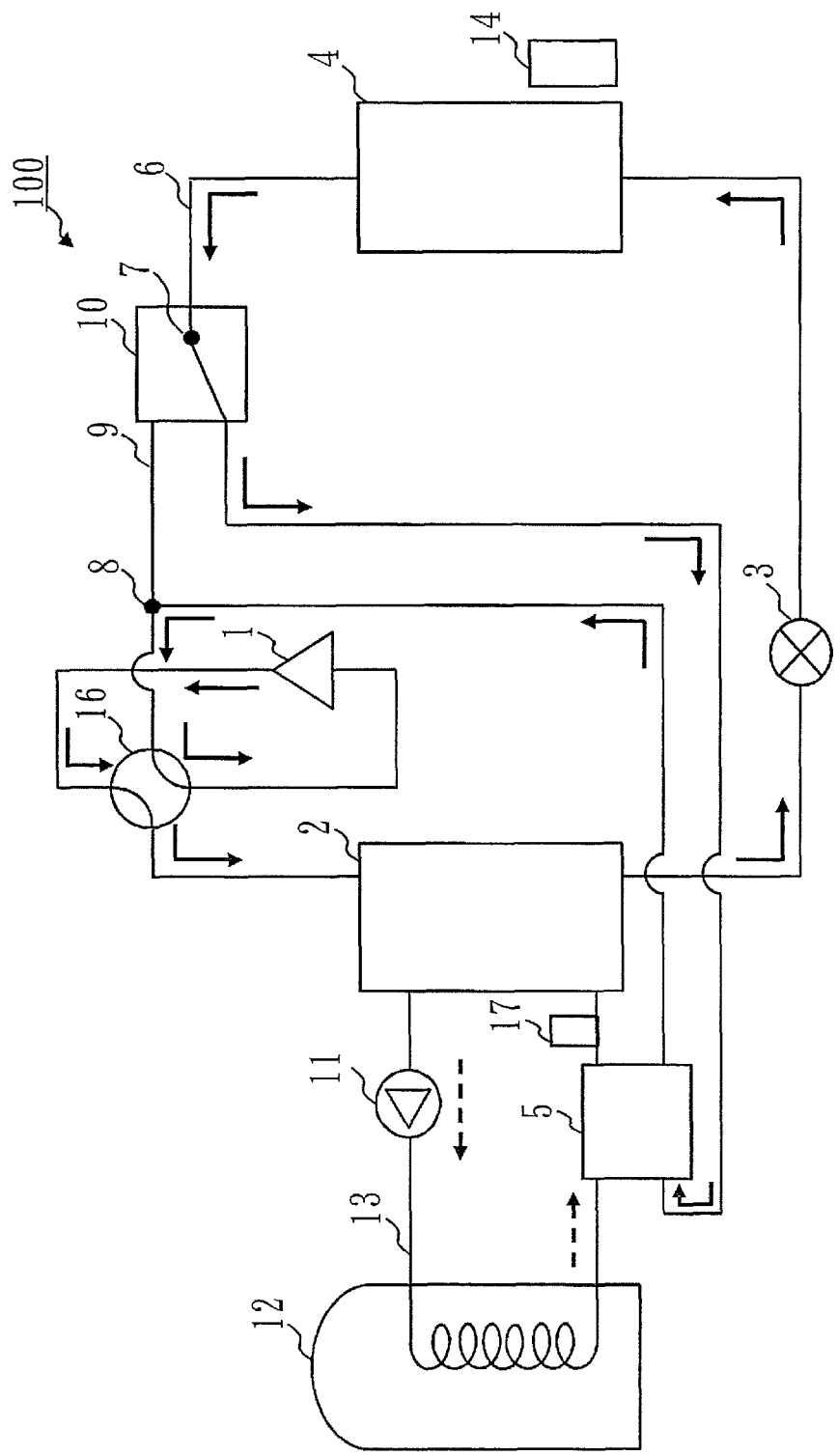
FIG. 8 is a diagram showing how the refrigerant and water flow in the heat pump apparatus 100 according to the second embodiment when the operating frequency is low and the ambient air temperature is low.

FIG. 8 is a diagram showing how the refrigerant and water flow in the heat pump apparatus 100 according to the second embodiment in a heating operation when the operating frequency is low and the ambient air temperature is low. In FIG. 8, solid arrows indicate a flow of the refrigerant, and dashed lines indicate a flow of the water.

In the heating operation when the operating frequency is low and the ambient air temperature is low, the four-way valve 16 is set by the control device 15 to open the solid-line side shown in FIG. 6, and the three-way valve 10 is set by the control device 15 to open the solid-line side shown in FIG. 6. With this arrangement, the heat pump apparatus 100 operates in the same manner as in the case of FIG. 3.

In the heating operation, when the temperature of the refrigerant flowing through the second heat exchanger 4 is low, moisture contained in the air settles on the second heat exchanger 4 and turns into frost. When the frost is attached to the second heat exchanger 4, efficiency of heat exchange in the second heat exchanger 4 is adversely affected. Accordingly, when the frost is attached to the second heat exchanger 4, a defrost operation to remove the frost is executed.

Figure 9:
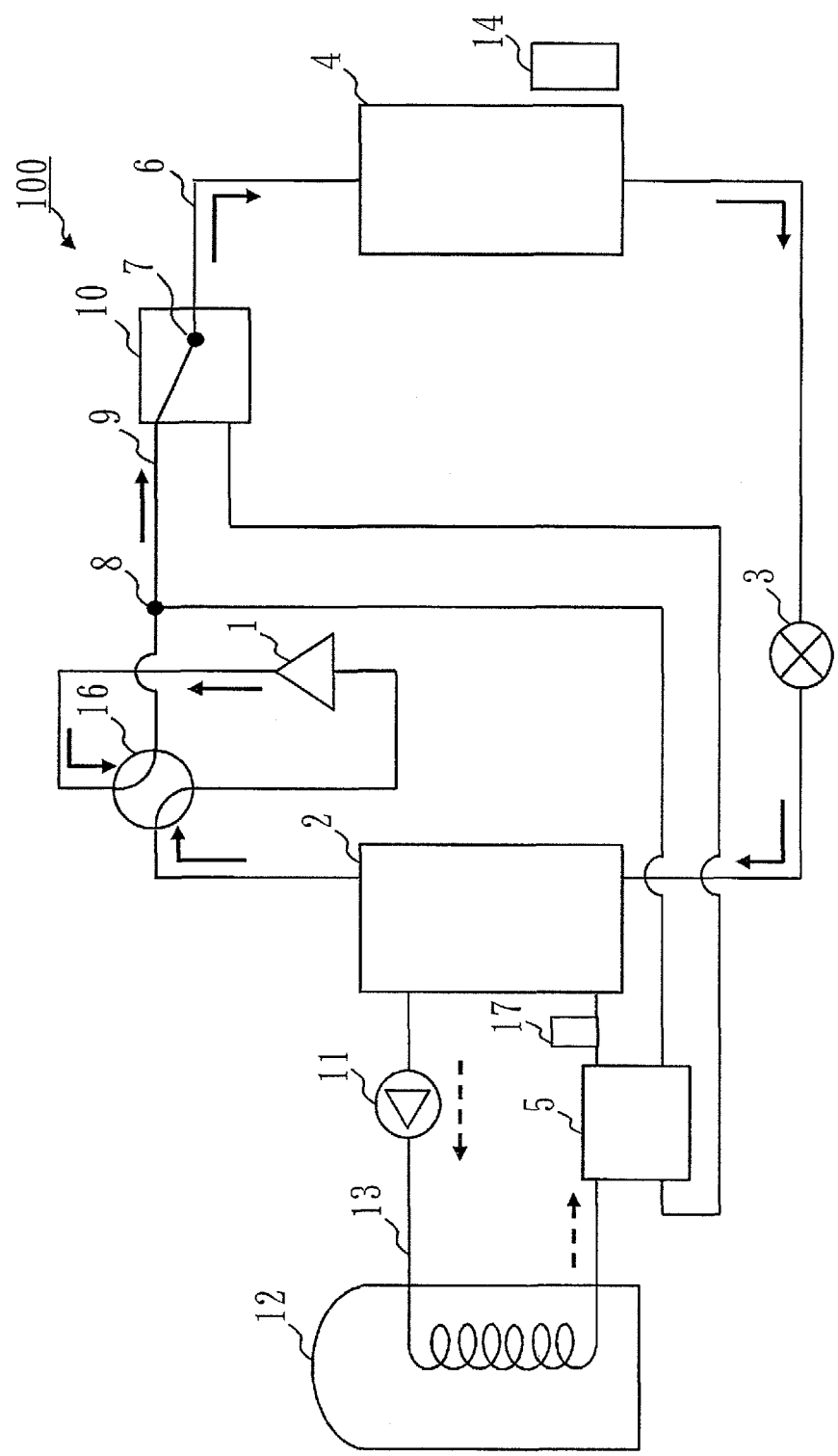
FIG. 9 is a diagram showing how the refrigerant and water flow in the heat pump apparatus 100 according to the second embodiment in a regular defrost operation.

FIG. 9 is a diagram showing how the refrigerant and water flow in the heat pump apparatus 100 according to the second embodiment in a regular defrost operation. In FIG. 9, solid arrows indicate a flow of the refrigerant, and dashed arrows indicate a flow of the water.

In the regular defrost operation, the four-way valve 16 is set by the control device 15 to open the dashed-line side shown in FIG. 6, and the three-way valve 10 is set by the control device 15 to open the dashed-line side shown in FIG. 6.

In the refrigerant circuit 6, the gas refrigerant being made high-temperature and high-pressure by the compressor 1 flows into the second heat exchanger 4 without passing through the third heat exchanger 5. The gas refrigerant that has flowed into the second heat exchanger 4 is heat-exchanged with the ambient air, and condenses and turns into the liquid refrigerant. At this time, the frost attached to the second heat exchanger 4 is melted by the high-temperature and high-pressure refrigerant that has flowed into the second heat exchanger 4. The liquid refrigerant passes through the expansion valve 3 where it expands, and turns into the gas-liquid two-phase refrigerant which is low-temperature and low-pressure. The gas-liquid two-phase refrigerant flows into the first heat exchanger 2 to be heat-exchanged with the water circulating in the water circuit 13, and evaporates and turns into the gas refrigerant. At this time, the water circulating in the water circuit 13 is cooled. The gas refrigerant is drawn into the compressor 1 to become high-temperature and high-pressure.

In the water circuit 13, the water cooled in the first heat exchanger 2 passes through the pump 11, and flows into the tank 12. The water that has flowed into the tank 12 is heat-exchanged with the water stored in the tank 12, thereby being heated. At this time, the water stored in the tank 12 is cooled. The heated water passes through the third heat exchanger 5, and flows into the first heat exchanger 2 again. Since the refrigerant is not flowing through the third heat exchanger 5, the water is not heat-exchanged in the third heat exchanger 5.

As described above, in the defrost operation, the low-temperature refrigerant flows into the first heat exchanger 2. There may be a situation where the refrigerant below 0 degrees flows into the first heat exchanger 2. In this case, the water circulating in the water circuit 13 may freeze in the first heat exchanger 2, and an increased volume of the water as a result of freezing may cause the heat exchanger 2 to be damaged.

Accordingly, when the temperature of the water flowing into the first heat exchanger 2 detected by the temperature sensor 17 is lower than a predetermined second temperature (when the water temperature is low), the control device 15 switches the setting of the three-way valve 10 to open the solid-line side shown in FIG. 6.

The second temperature is a temperature slightly higher than the freezing point. The second temperature varies depending on the size (heat exchange amount) of the first heat exchanger 2, and so on. Thus, for example, values obtained in advance through computation or simulation are stored in the memory or the like included in the control device 15.

Figure 10:
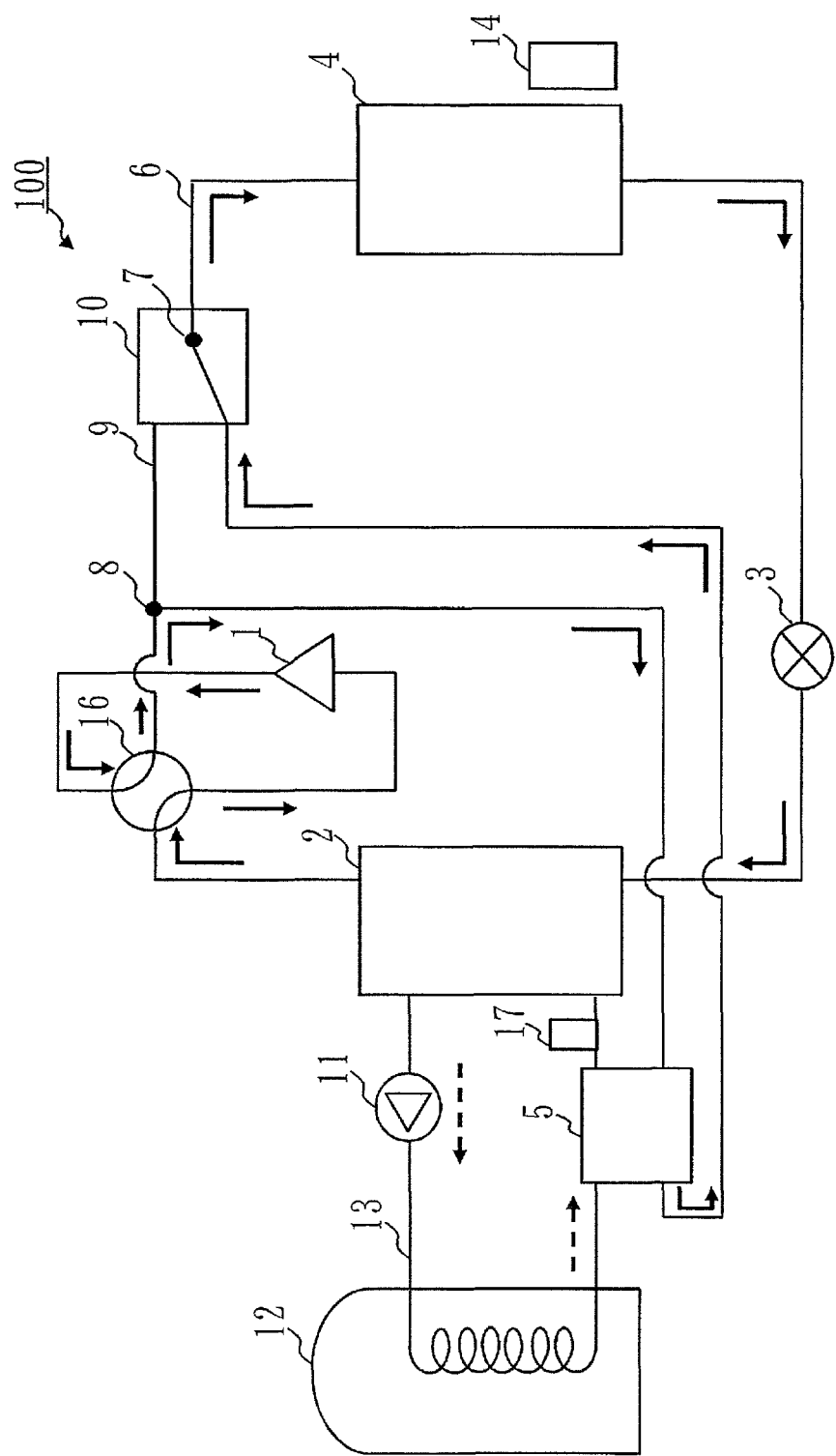
FIG. 10 is a diagram showing how the refrigerant and water flow in the heat pump apparatus 100 according to the second embodiment in a defrost operation when the water temperature is low.

FIG. 10 is a diagram showing how the refrigerant and water flow in the heat pump apparatus 100 according to the second embodiment in a defrost operation when the water temperature is low. In FIG. 10, solid arrows indicate a flow of the refrigerant, and dashed arrows indicate a flow of the water.

In the defrost operation when the water temperature is low, the four-way valve 16 is set by the control device 15 to open the dashed-line side shown in FIG. 6, and the three-way valve 10 is set by the control device 15 to open the solid-line side shown in FIG. 6.

In the refrigerant circuit 6, the gas refrigerant being made high-temperature and high-pressure by the compressor 1 flows in a direction of the third heat exchanger 5, and flows into the third heat exchanger 5. The gas refrigerant that has flowed into the third heat exchanger 5 is heat-exchanged with the water circulating in the water circuit 13. At this time, the water is heated by the high-temperature and high-pressure refrigerant that has flowed into the third heat exchanger 5, while the refrigerant is cooled.

The cooled refrigerant passes through the three-way valve 10, and flows into the second heat exchanger 4. The refrigerant that has flowed into the second heat exchanger 4 is heat-exchanged with the ambient air, and condenses and turns into the liquid refrigerant. At this time, the frost attached to the second heat exchanger 4 is melted by the refrigerant that has flowed into the second heat exchanger 4. Note that the refrigerant flowing into the second heat exchanger 4 has been cooled in the third heat exchanger 5. However, it is possible to keep the refrigerant cooled in the third heat exchanger 5 at a certain high temperature by adjusting the flow volume of the refrigerant or by other methods, and it is possible to melt the frost attached to the second heat exchanger 4.

The liquid refrigerant passes through the expansion valve 3 where it expands, and turns into the gas-liquid two-phase refrigerant which is low-temperature and low-pressure. The gas-liquid two-phase refrigerant flows into the first heat exchanger 2 to be heat-exchanged with the water circulating in the water circuit 13, and evaporates and turns into the gas refrigerant. At this time, the water circulating in the water circuit 13 is cooled. The gas refrigerant is drawn into the compressor 1 to become high-temperature and high-pressure.

In the water circuit 13, the water cooled in the first heat exchanger 2 passes through the pump 11, and flows into the tank 12. The water that has flowed into the tank 12 is heat-exchanged with the water stored in the tank 12, thereby being heated. At this time, the water stored in the tank 12 is cooled. The heated water is heat-exchanged with the refrigerant in the third heat exchanger 5, thereby being heated, and flows into the first heat exchanger 2 again.

That is, when the temperature of the water flowing into the first heat exchanger 2 is low, the refrigerant is made to flow to the third heat exchanger 5, and the water circulating in the water circuit 13 is heated by the refrigerant in the third heat exchanger 5. In this way, the water is prevented from freezing in the first heat exchanger 2.

Figure 11:
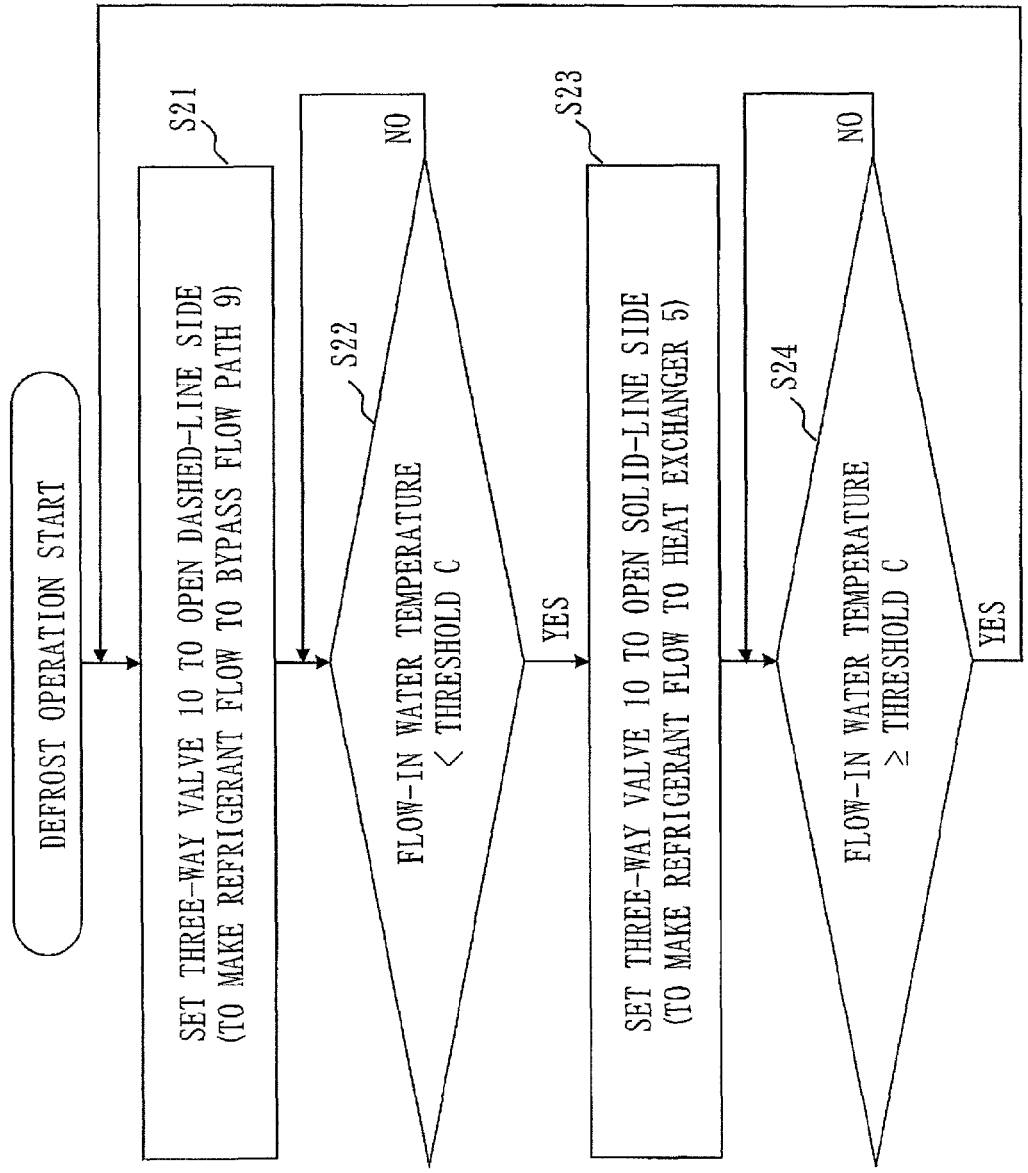
FIG. 11 is a flowchart showing an operation to control the three-way valve 10 by the control device 15 in the defrost operation according to the second embodiment.

FIG. 11 is a flowchart showing an operation to control the three-way valve 10 by the control device 15 according to the second embodiment in the defrost operation.

(S21)
The control device 15 sets the three-way valve 10 to open the dashed-line side shown in FIG. 6. With this setting, the refrigerant does not flow through the third heat exchanger 5.

(S22)
The control device 15 determines whether the temperature of the water flowing into the first heat exchanger 2 detected by the temperature sensor 17 is lower than the second temperature (threshold C).

If the temperature of the water flowing into the first heat exchanger 2 is lower than the second temperature (YES in S22), processing proceeds to S23. In other cases (NO in S22), determination in S22 is performed again after a predetermined period of time passes.

(S23)
The control device 15 sets the three-way valve 10 to open the solid-line side shown in FIG. 6. With this setting, the refrigerant flows to the third heat exchanger 5.

(S24)
The control device 15 determines whether the temperature of the water flowing into the first heat exchanger 2 detected by the temperature sensor 17 is equal to or higher than the second temperature (threshold C).

If the temperature of the water flowing into the first heat exchanger 2 is equal to or higher than the second temperature (YES in S24), processing returns to S21. In other cases (NO in S24), determination in S24 is performed again after a predetermined period of time passes.

As described above, in the heat pump apparatus 100 according to the second embodiment, if the temperature of the water flowing into the first heat exchanger 2 is lower than the second temperature, it is determined that the water freezes in the first heat exchanger 2. In this case, the high-temperature and high-pressure refrigerant discharged from the compressor 1 is made to flow into the third heat exchanger 5.

With this arrangement, the water is heated in the third heat exchanger 5 before flowing into the first heat exchanger 2. Thus, the water can be prevented from freezing in the first heat exchanger 2.

Figure 12:
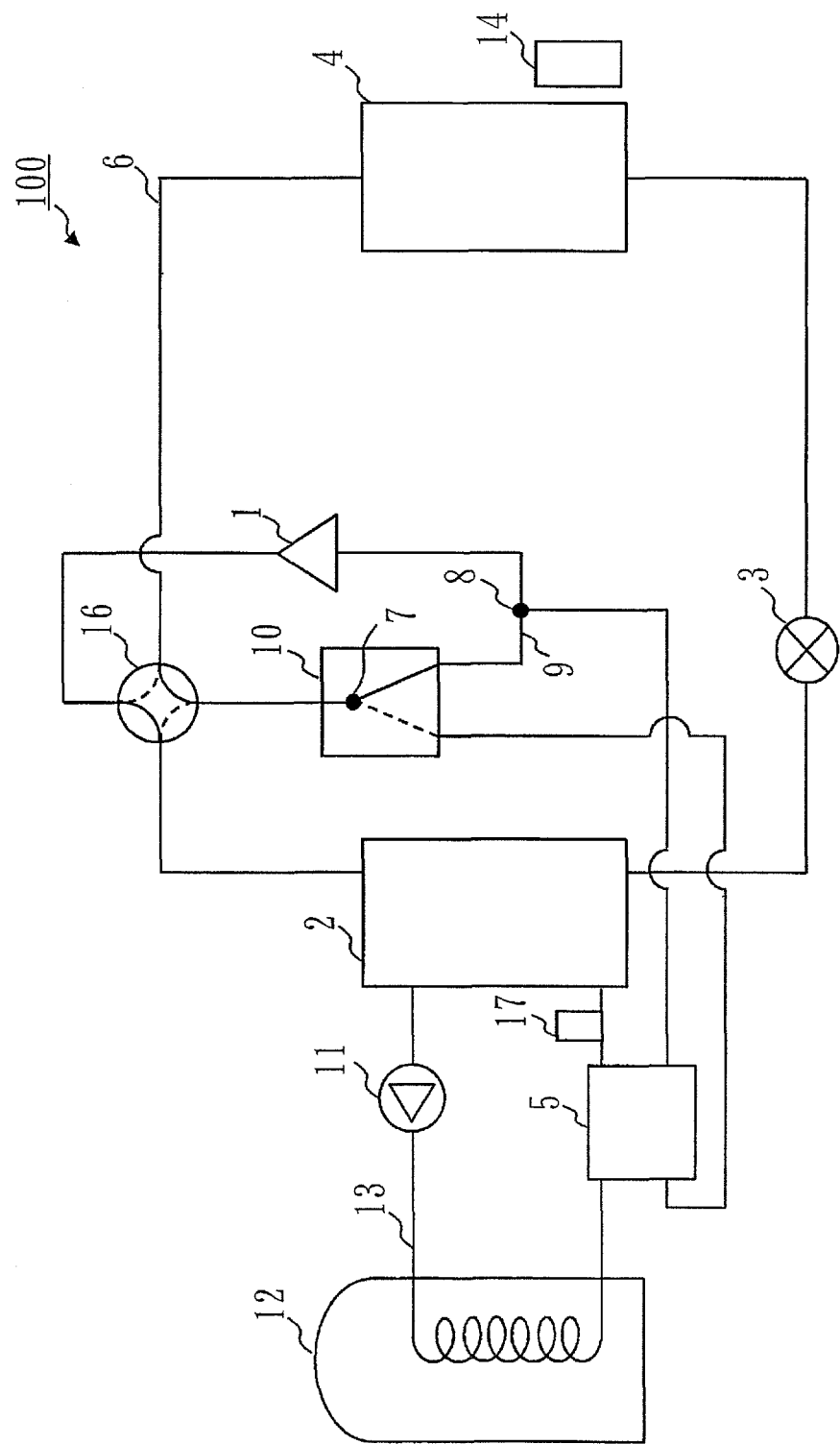
FIG. 12 is a diagram showing an example of other positions of a first connection point 7 and a second connection point 8.

In FIG. 6, the first connection point 7 and the second connection point 8, which are branch points in the bypass flow path 9, are positioned between the second heat exchanger 4 and the four-way valve 16. Alternatively, if the only aim is to prevent the liquid refrigerant from being drawn into the compressor 1 in the heating operation, and if it is not aimed at preventing the water from being frozen in the first heat exchanger 2 in the defrost operation, the first connection point 7 and the second connection point 8 may be positioned between the four-way valve 16 and the compressor 1, as shown in FIG. 12.

Figure 13:
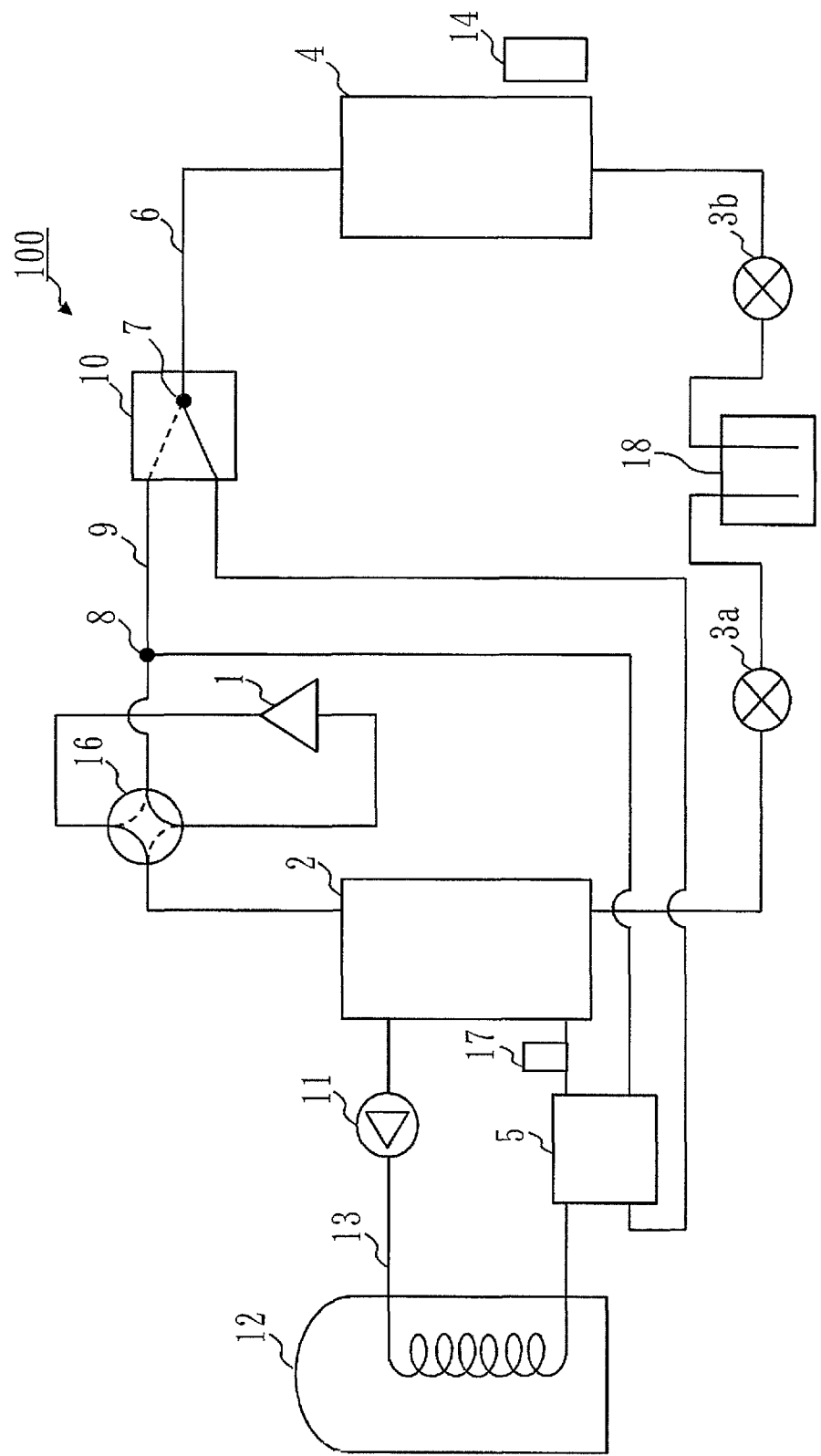
FIG. 13 is a diagram showing another example of a refrigerant circuit 6.

The refrigerant circuit 6 configured by adding the third heat exchanger 5 to a circuit of a basic configuration has been used in the above description. Alternatively, for example, the refrigerant circuit 6 may be configured by replacing the expansion valve 3 shown in FIG. 6 with an expansion valve 3a, a receiver 18, and an expansion valve 3b sequentially connected with pipes as shown in FIG. 13. With such a configuration, by controlling the expansion valves 3a and 3b, a degree of supercooling in the first heat exchanger 2 and a degree of superheating in the second heat exchanger 4 can be controlled appropriately.

In the above description, the three-way valve 10 is provided at the position of the first connection point 7. Alternatively, the three-way valve 10 may be provided at the position of the second connection point 8, instead of the position of the first connection point 7.

In the above description, the tank 12 is used as an example of a radiator. Alternatively, a heating apparatus such as a floor heating or a panel heater may be used as a radiator, for example.

In the above description, the first heat exchanger 2 is a plate-type heat exchanger, for example. When a plate-type heat exchanger is used as the first heat exchanger 2, it is desirable to make the water flow from the lower portion to the upper portion of the plate-type heat exchanger, with consideration given to effects of distribution of the water. In this case, it is desirable to make the refrigerant flow from the upper portion to the lower portion of the plate-type heat exchanger so that the flow of the refrigerant is countercurrent to the flow of the water.

Other types of heat exchanger such as a twisted tube heat exchanger may be used as the first heat exchanger 2.

In the above description, the ambient air is used as the heat exchange agent to be heat-exchanged with the refrigerant in the second heat exchanger 4. Alternatively, the heat exchange agent may be a fluid or the like, such as water circulating in another circuit or the like.

In the above description, water is used as an example of a fluid. Alternatively, other types of fluid may be used.

Numerous additional modifications and variations are possible in light of the above teachings. It is therefore to be understood that, within the scope of the appended claims, the disclosure of this patent specification may be practiced otherwise than as specifically described herein.

LIST OF REFERENCE SIGNS

1: compressor, 2: first heat exchanger, 3: expansion valve, 4: second heat exchanger, 5: third heat exchanger, 6: refrigerant circuit, 7: first connection point, 8: second connection point, 9: bypass flow path, 10: three-way valve, 11: pump, 12: tank, 13: water circuit, 14: temperature sensor, 15; control device, 16: four-way valve, 17: temperature sensor, 18: receiver, 100: heat pump apparatus

The invention claimed is:

1. A heat pump apparatus comprising:
  a refrigerant circuit in which a refrigerant circulates, and which is configured by sequentially connecting a compressor, a first heat exchanger, an expansion valve, a second heat exchanger, and a third heat exchanger, and connecting a bypass flow path bypassing the third heat exchanger between the second heat exchanger and the compressor;
  a fluid circuit in which a fluid circulates, and which is configured by sequentially connecting the third heat exchanger, the first heat exchanger, and a radiator;
  a flow path switching device that switches between making the refrigerant flow through the third heat exchanger and making the refrigerant flow through the bypass flow path without flowing through the third heat exchanger; and
  a control device configured to set the flow path switching device to make the refrigerant flow through the third heat exchanger based upon an operating frequency of the compressor being lower than a predetermined frequency, and an opening degree of the expansion valve being a minimum degree, and a temperature of a predetermined heat exchange agent being lower than a predetermined first temperature,
  wherein the second heat exchanger is configured to make the refrigerant heat-exchanged with the predetermined heat exchange agent, and
  wherein the expansion valve is located in series directly between the first heat exchanger and the second heat exchanger.

2. The heat pump apparatus according to claim 1,
  wherein in a defrost operation for removing frost attached to the second heat exchanger, when a temperature of the fluid flowing into the first heat exchanger is lower than a predetermined second temperature, the flow path switching device makes the refrigerant flow through the third heat exchanger.

3. The heat pump apparatus according to claim 1,
  wherein the heat exchange agent is ambient air.

4. A method of operating a heat pump apparatus including a compressor, a first heat exchanger, an expansion valve, a second heat exchanger, and a third heat exchanger connected in series, and a bypass flow path bypassing the third heat exchanger between the second heat exchanger and the compressor, and a flow path switching device that switches between making refrigerant flow through the third heat exchanger and making the refrigerant flow through the bypass flow path without flowing through the third heat exchanger, the method comprising:
  setting the flow path switching device to a first position configured to make the refrigerant flow through the bypass flow path;
  determining, after setting the flow path switching device to the first position, that an operating frequency of the compressor is lower than a frequency threshold;
  determining, after setting the flow path switching device to the first position, that a degree of opening of the expansion valve is a minimum degree;
  determining, after setting the flow path switching device to the first position, that a temperature of a heat exchange agent that exchanges heat with the second heat exchanger is lower than a first temperature threshold; and
  setting the flow path switching device to a second position configured to make the refrigerant flow through the third heat exchanger after determining that the operating frequency of the compressor is lower than the frequency threshold, that the degree of opening of the expansion valve is the minimum degree, and that the temperature of the heat exchange agent is lower than the first temperature threshold.

5. The method according to claim 4, further comprising determining, after setting the flow path switching device to the second position, that the operating frequency of the compressor is higher than or equal to the frequency threshold; and setting the flow path switching device to back to the first position configured to make the refrigerant flow through the bypass flow path after determining that the operating frequency of the compressor is higher than or equal to the frequency threshold.

6. The method according to claim 4, further comprising determining, after setting the flow path switching device to the second position, that the degree of opening of the expansion valve is greater than the minimum degree; and setting the flow path switching device to back to the first position configured to make the refrigerant flow through the bypass flow path after determining that the degree of opening of the expansion valve is greater than the minimum degree.

7. The method according to claim 4, further comprising determining, after setting the flow path switching device to the second position, that the temperature of the heat exchange agent is higher than or equal to the first temperature threshold; and setting the flow path switching device to back to the first position configured to make the refrigerant flow through the bypass flow path after determining that the temperature of the heat exchange agent is higher than or equal to the first temperature threshold.

8. The method according to claim 4, wherein the second heat exchanger is configured to make the refrigerant heat-exchanged with the predetermined heat exchange agent.

9. The method according to claim 4, further comprising determining in a defrost operation for removing frost attached to the second heat exchanger that a temperature of fluid flowing into the first heat exchanger is lower than a second temperature threshold; and setting the flow path switching device to the second position configured to make the refrigerant flow through the third heat exchanger after determining that the temperature of fluid flowing into the first heat exchanger is lower than the second temperature threshold.

10. The method according to claim 4, wherein the heat exchange agent is ambient air.

11. A method of operating a heat pump apparatus including a compressor, a first heat exchanger, an expansion valve, a second heat exchanger, and a third heat exchanger connected in series, and a bypass flow path bypassing the third heat exchanger between the second heat exchanger and the compressor, and a flow path switching device that switches between making refrigerant flow through the third heat exchanger and making the refrigerant flow through the bypass flow path without flowing through the third heat exchanger, the method comprising:

setting the flow path switching device to a first position configured to make the refrigerant flow through the bypass flow path;

determining, after setting the flow path switching device to the first position, that a flow-in water temperature of the first heat exchanger is lower than a temperature threshold; and setting the flow path switching device to a second position configured to make the refrigerant flow through the third heat exchanger after determining that the flow-in water temperature of the first heat exchanger is lower than the temperature threshold.

12. The method according to claim 11, further comprising determining, after setting the flow path switching device to the second position, that the flow-in water temperature of the first heat exchanger is greater than or equal to the temperature threshold; and setting the flow path switching device to back to the first position configured to make the refrigerant flow through the bypass flow path after determining that the flow-in water temperature of the first heat exchanger is greater than or equal to the temperature threshold.

13. The method according to claim 11, wherein the expansion valve is located in series directly between the first heat exchanger and the second heat exchanger.

* * * * *